United States Patent
Khalil et al.

(10) Patent No.: US 10,715,052 B2
(45) Date of Patent: Jul. 14, 2020

(54) INVERTER TOPOLOGY

(71) Applicant: Caterpillar Inc., Deerfield, IL (US)

(72) Inventors: Ahmed Khalil, Dunlap, IL (US); Jackson Wai, Dunlap, IL (US); Jesse Gerdes, Dunlap, IL (US); James Thorne, Peoria, IL (US); Amir Saad, Arlington, VA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/109,277

(22) Filed: Aug. 22, 2018

(65) Prior Publication Data

US 2020/0067422 A1 Feb. 27, 2020

(51) Int. Cl.
*H02P 29/024* (2016.01)
*H02M 7/537* (2006.01)
*H02P 27/06* (2006.01)

(52) U.S. Cl.
CPC .......... *H02M 7/537* (2013.01); *H02P 27/06* (2013.01)

(58) Field of Classification Search
CPC ........ H02P 27/05; H02P 25/08; H02M 7/537; H02M 3/158; H01L 27/02; H02K 1/12; H02K 3/28

USPC ....... 318/254, 254.1, 701, 772, 773, 400.17, 318/125; 310/156, 162, 165, 168
See application file for complete search history.

(56) References Cited

U.S. PATENT DOCUMENTS

| 5,280,421 A | 1/1994 | De Doncker et al. |
| 9,837,950 B2 * | 12/2017 | Otani .................... H02P 27/085 |
| 2005/0127865 A1 * | 6/2005 | Kiuchi .................... H02P 6/21 318/802 |
| 2010/0123426 A1 * | 5/2010 | Nashiki .................... H02K 1/12 318/701 |
| 2013/0314014 A1 * | 11/2013 | Tremel .................... H02M 1/32 318/400.22 |
| 2017/0126145 A1 * | 5/2017 | Schulz .................... H02M 7/537 |
| 2019/0028052 A1 * | 1/2019 | Yasunaka ............... H02P 29/024 |

FOREIGN PATENT DOCUMENTS

| CN | 106301053 A | 1/2017 |
| CN | 107884652 A | 4/2018 |
| JP | 2009050042 A | 3/2009 |
| JP | 2013090511 A | 5/2013 |
| KR | 20120091965 | 8/2012 |

* cited by examiner

*Primary Examiner* — Rajnikant B Patel
(74) *Attorney, Agent, or Firm* — Harrity & Harrity LLP

(57) ABSTRACT

An electrical inverter may include a plurality of phase modules to provide a plurality of phase outputs. Two or more of the plurality of phase modules may share a common insulated-gate bipolar transistor.

21 Claims, 3 Drawing Sheets

US 10,715,052 B2

INVERTER TOPOLOGY

TECHNICAL FIELD

The present disclosure relates generally to an inverter and, more particularly, to an inverter topology for an electric motor of a machine.

BACKGROUND

A machine may include a transmission coupled to a power source, such as an internal combustion engine or an electric motor to enable the machine to be repositioned and/or to travel between locations. With increased interest in energy conservation and avoidance of use of fossil fuels, use of electric motors is becoming more common. Electric motors may be used to convert electrical energy into mechanical power to drive the machine. For example, electric motors may be used in a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other equipment.

Alternatively, some machines may include both an electric motor and an internal combustion engine. For example, an electrical drive train of a machine, such as a tractor, may include an internal combustion engine, a generator coupled to the internal combustion engine, a direct current (DC) power source, and a motor. In this case, the internal combustion engine may be used to reposition the machine, and the generator, the DC power source, and the motor may be used to drive one or more implements of the machine. An inverter may be coupled to the DC power source and the motor to convert DC to AC power. The inverter may provide the AC power to the generator to electrically drive the motor and/or to electrically brake the motor.

The motor may be a switched reluctance (SR) motor, which may be controlled using open-loop table-based control based on phases provided by the inverter. However, an inverter topology for driving such a motor may require two power switches and two diodes for each phase of the inverter. This may result in a quantity of 2n components for the inverter topology, where n represents a quantity of phases of the inverter. In another inverter topology, capacitors may be added to the inverter to receive energy from a phase being switched from on to off. These components may be expensive and/or prone to failure, damage, and/or the like.

One attempt to improve inverters is disclosed in China Patent No. CN107884652 that was filed by Hefei Kewell Power System Co., Ltd. on Apr. 6, 2018 ("the '652 patent"). In particular, the '652 patent discloses a high voltage DC electronic load control system. The load control system, disclosed in the '652 patent, includes multiple DC chopper type insulated-gate bipolar transistors (IGBTs), thereby providing a feedback system for load control.

However, reduction of a quantity of IGBTs and/or other components in an inverter topology may be advantageous with regard to improving functioning of a machine, an electrical drive train, an inverter, and/or the like. The inverter topology of the present disclosure solves one or more problems set forth above and/or other problems in the art.

SUMMARY

According to some implementations, the present disclosure is related to an electrical inverter. The electrical inverter may include a plurality of phase modules to provide a plurality of phase outputs. Two or more of the plurality of phase modules may share a common insulated-gate bipolar transistor.

According to some implementations, the present disclosure is related to a system. The system may include a multi-phase electrical inverter. Two or more phase modules, of a plurality of phase modules of the multi-phase electrical inverter, may share a common transistor and a common diode. The system may include a motor coupled to the multi-phase electrical inverter.

According to some implementations, the present disclosure is related to an inverter. The inverter may include a plurality of electromagnets. The inverter may include a plurality of diodes coupled to the plurality of electromagnets to provide a voltage. The inverter may include a plurality of insulated-gate bipolar transistors coupled to the plurality of electromagnets and the plurality of diodes to selectively activate the plurality of electromagnets to cause a phase output from the inverter. A first insulated-gate bipolar transistor, of the plurality of insulated-gate bipolar transistors, may be coupled to a first electromagnet and to a second electromagnet of the plurality of electromagnets. A second insulated-gate bipolar transistor, of the plurality of insulated-gate bipolar transistors, may be coupled to the second electromagnet and to a third electromagnet of the plurality of electromagnets. A third insulated-gate bipolar transistor, of the plurality of insulated-gate bipolar transistors, may be coupled to the third electromagnet and not to the first electromagnet and not to the second electromagnet.

DETAILED DESCRIPTION

This disclosure relates to an inverter topology. The inverter topology has universal applicability to any machine utilizing such an inverter topology. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, and/or the like. Moreover, one or more implements may be connected to the machine and controlled using an electric motor associated with the inverter topology described herein.

Figure 1:
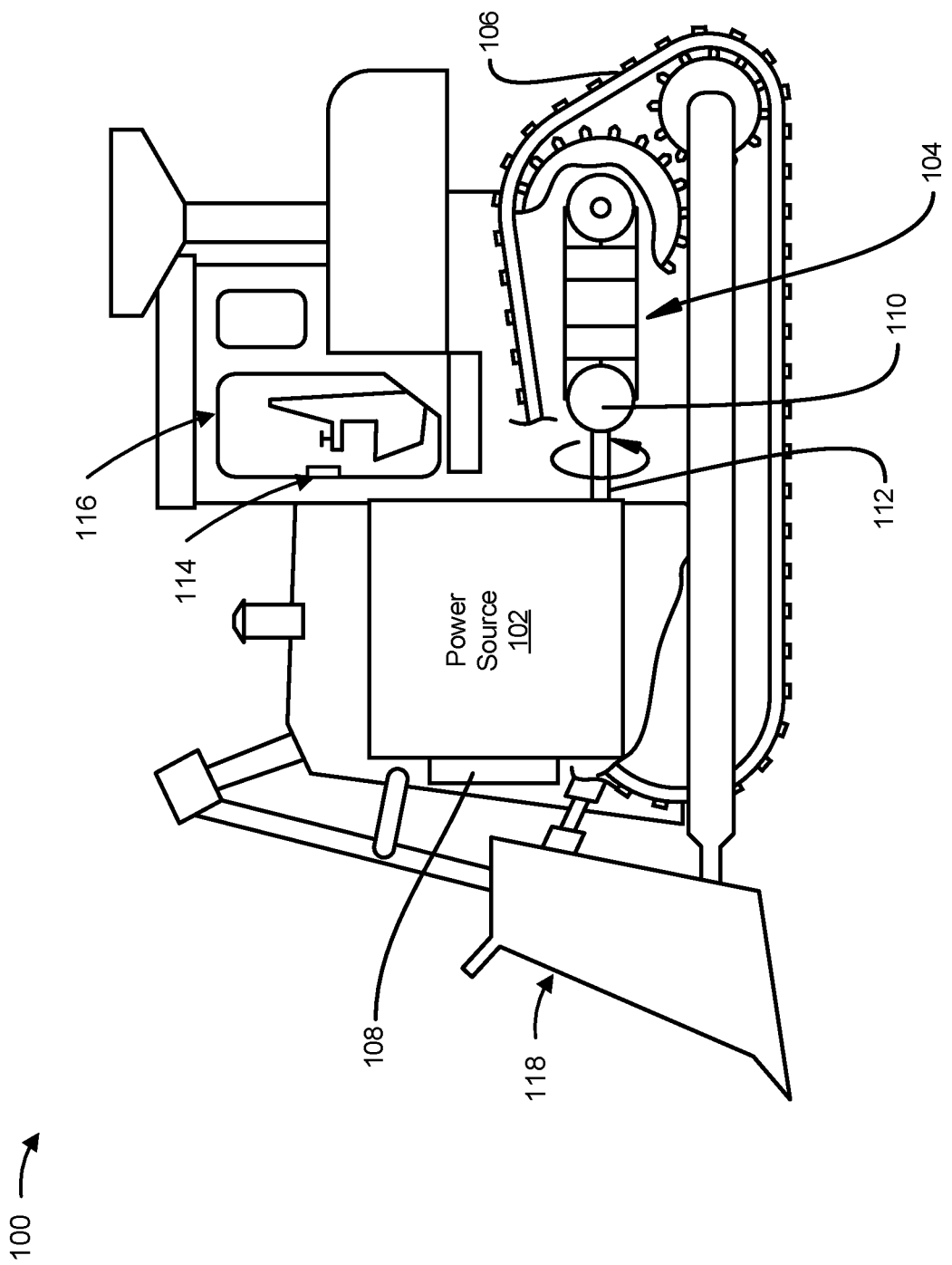
FIG. 1 is a diagram of an example machine that includes an inverter.

FIG. 1 is a diagram of an example machine 100 that includes an inverter topology. The machine 100 is shown as a track type tractor but may include any type of machine that includes an inverter topology capable of providing a phase output to control an electric motor of machine 100.

As shown, machine 100 may have a power source 102, an electric drive system 104, a traction system 106, an inverter 108, a motor 110, and a drive shaft 112. The power source 102 is configured to supply power to the machine 100. In some implementations, the power source 102 may be a direct current (DC) power source. The power source 102 may be operably arranged to receive control signals from the operator controls 114 in operator station 116. The, the power source 102 may be operably arranged with the electric drive system 104 and/or an implement 118 to selectively operate the electric drive system 104 and/or the implement 118 according to control signals received from the operator controls 114. The power source 102 may provide operating power for the propulsion of the electric drive system 104 and/or the operation of the implement 118 via, for example, the electric drive system 104, the inverter 108, the motor 110, the drive shaft 112, and/or the like.

The electric drive system 104 may be operably arranged with the power source 102 to selectively propel the machine 100 via control signals from the operator controls 114. The electric drive system 104 may be operably connected to a plurality of ground-engaging members, such as traction system 106, as shown, which may be movably connected to the machine 100 through axles, drive shafts, and/or other components and which may be movably connected to electric drive system 104 via the motor 110 and the drive shaft 112. In some implementations, the traction system 106 may be provided in the form of a track-drive system, a wheel-drive system, or any other type of drive system configured to propel the machine 100. In some implementations, the electric drive system 104 may be operably arranged with power source 102 to selectively operate the implement 118, which may be movably connected to the machine 100 and to the electric drive system 104.

The inverter 108 may be electrically connected to the power source 102 and/or the electric drive system 104. In some implementations, the inverter 108 may receive a DC current from the power source 102 and may control a phase of the DC current to provide an AC current to the motor 110, which may be a switched reluctance (SR) motor. Additionally, or alternatively, inverter 108 may provide the AC current to a generator. In this way, the inverter 108 may provide operating power for the propulsion of the machine 100 and/or the operation of the implement 118.

The implement 118 may be operably arranged with the electric drive system 104 such that the implement 118 is selectively movable through control signals transmitted from the operator controls 114 to the electric drive system 104, the inverter 108, the motor 110, the drive shaft 112, and/or the like. The illustrated implement 118 is a tractor loader. Other embodiments can include any other suitable implement for a variety of tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

As indicated above, FIG. 1 is provided as an example. Other examples are possible and may differ from what was described in connection with FIG. 1.

Figure 2A:
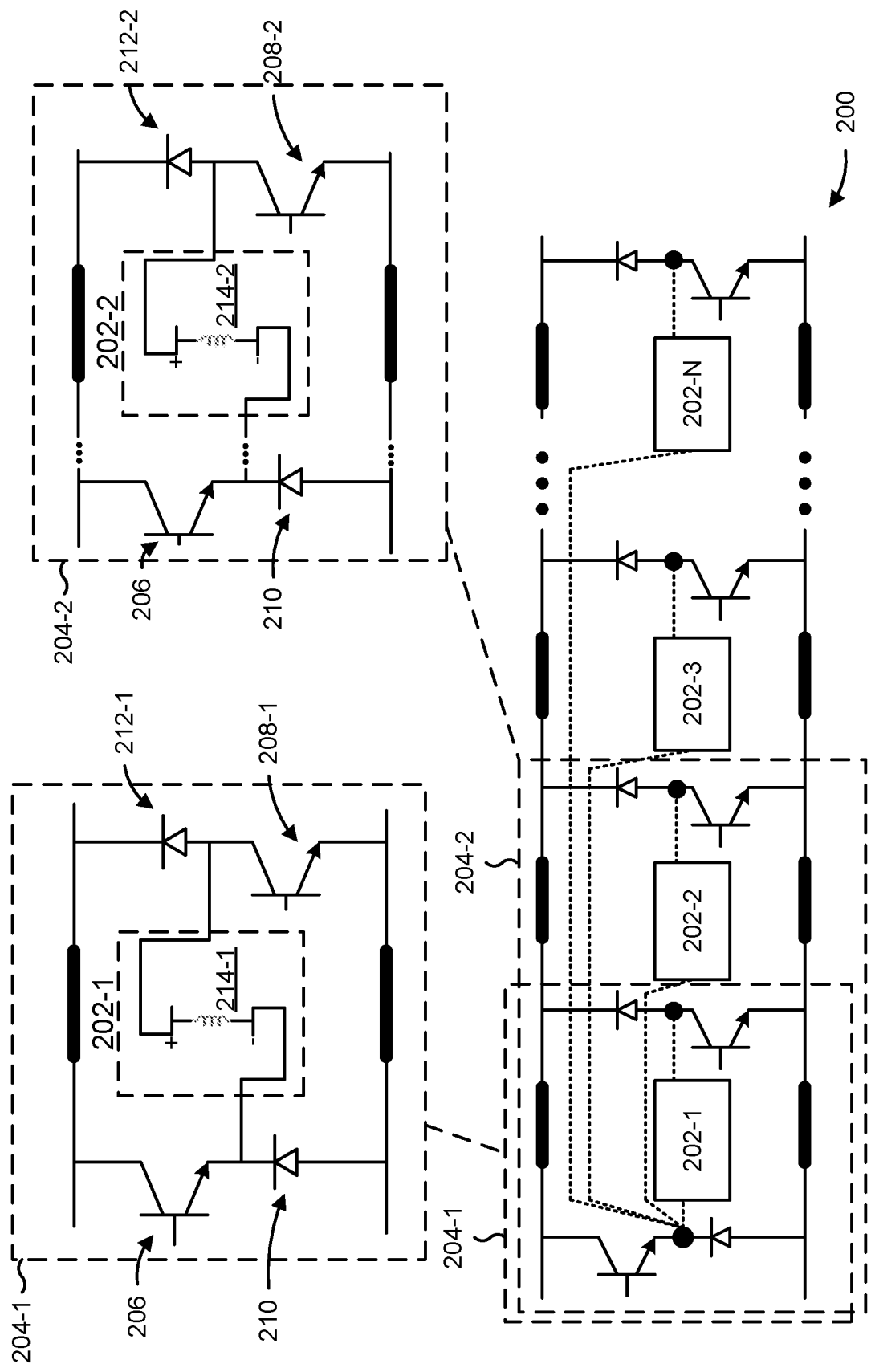
FIGS. 2A and 2B are diagrams of example inverter topologies that may be used with the machine of FIG. 1.
Figure 2B:
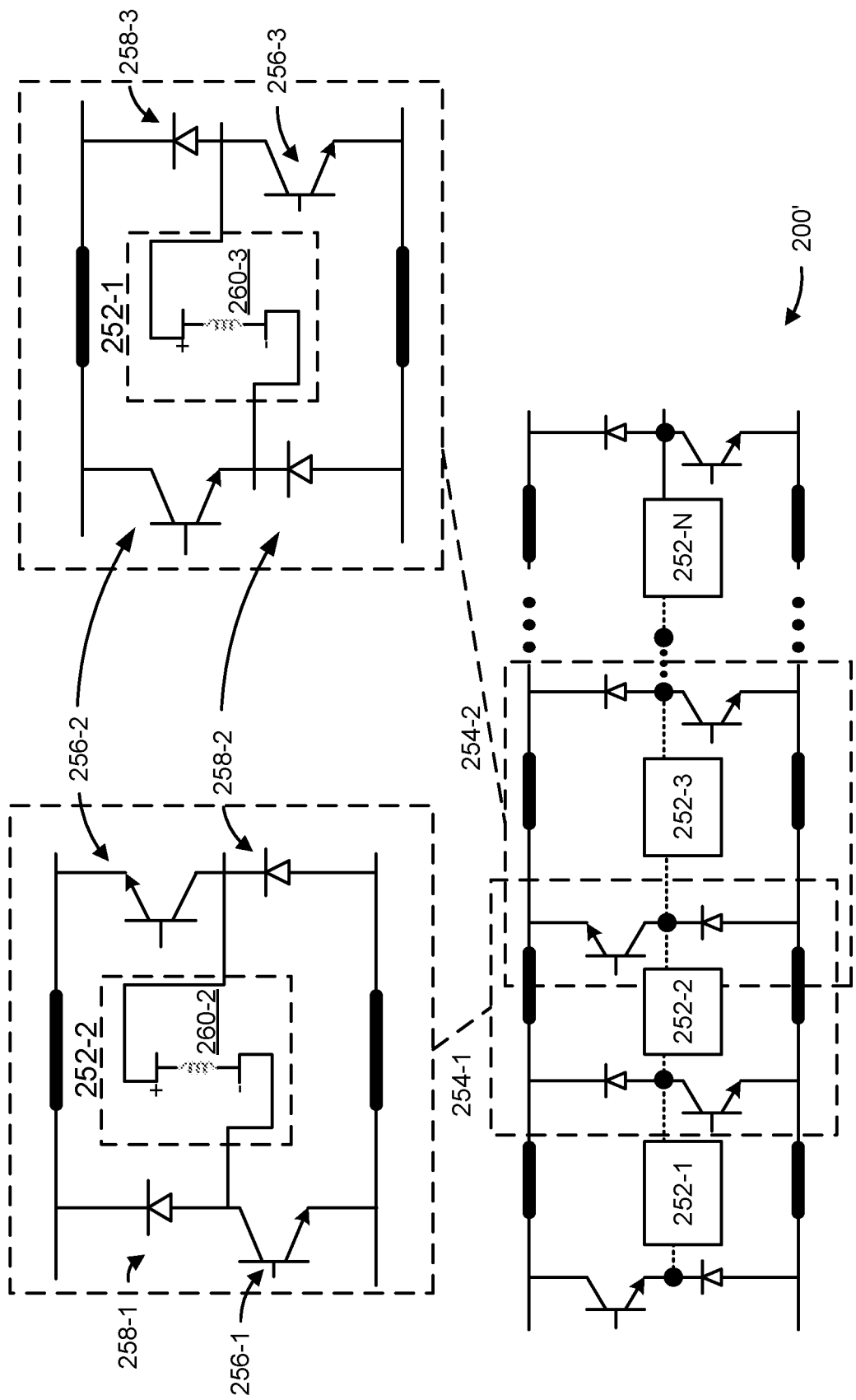

FIGS. 2A and 2B are diagrams relating to an example inverter topology 200/200'. In some implementations, inverter topology 200/200' may correspond to inverter 108 in FIG. 1.

As shown in FIG. 2A, the inverter topology 200 includes a set of phase modules 202-1, 202-2, 202-3, . . . , 202-N configured in an n+1 type of inverter topology. In some implementations, N may be 3 (e.g., there may be 3 phase modules 202), and the 3 phase modules 202 may enable a 3-phase inverter, a 6-phase inverter, and/or the like.

As further shown in FIG. 2A and by call-out 204-1, the phase module 202-1 is electrically coupled to a shared switch 206, a non-shared switch 208-1, a shared diode 210, and a non-shared diode 212-1. In some implementations, a switch, such as the shared switch 206, the non-shared switch 208-1, and/or the like may be an insulated-gate bipolar transistor (IGBT). For example, each phase module 202 may share a single IGBT, such as shared switch 206. In contrast, each phase module 202 may be associated with a different, respective IGBT, such as a respective non-shared switch 208.

In some implementations, the phase module 202-1 is coupled to an electromagnet 214-1 to provide a phase output to enable inversion of DC current to AC current. A first electrical path is formed, for the phase module 202-1, by the shared switch 206, the non-shared diode 212-1, and the electromagnet 214-1. A second electrical path is formed, for the phase module 202-1, by the non-shared switch 208-1, the shared diode 210, and the electromagnet 214-1. In this case, each electrical path is associated with a voltage source to provide a voltage, and causes electromagnet 214-1 to provide a magnetic field based on the voltage.

Similarly, as further shown in FIG. 2A and by call-out 204-2, the phase module 202-2 is electrically coupled to the shared switch 206, a non-shared switch 208-2, the shared diode 210, and a non-shared diode 212-2. In some implementations, the phase module 202-2 is coupled to an electromagnet 214-2 to provide a phase output to enable inversion of DC current to AC current. A first electrical path is formed, for the phase module 202-2, by the shared switch 206, the non-shared diode 212-2, and the electromagnet 214-2. A second electrical path is formed, for the phase module 202-2, by the non-shared switch 208-2, the shared diode 210, and the electromagnet 214-2. In this case, each electrical path is associated with a voltage source to provide a voltage, and causes electromagnet 214-2 to provide a magnetic field based on the voltage.

In this case, each phase module 202 is coupled to the shared switch 206 and the shared diode 210 as well as to a respective non-shared switch 208 and a respective non-shared diode 212. As a result, the phase modules 202 are partially decoupled such that shared switch 206 operates a first electrical path of each phase module 202 and with different respective non-shared diodes 212, but each phase module 202 maintains a second electrical path independently operated by a respective non-shared switch 208 and with the shared diode 210. In this way, inverter topology 200 reduces a quantity of diodes and switches relative to a fully decoupled 2n type of inverter topology wherein each phase module is associated with two non-shared switches and two non-shared diodes. For example, an n+1 inverter topology achieved by inverter topology 200 is associated with a quantity t=n+1 switches (wherein t represents a quantity of IGBTs used as the switches) and a quantity d=n+1 diodes (wherein d represents a quantity of diodes), and wherein n represents a quantity of phase modules 202 in the inverter topology 200 (n=N). In this way, inverter topology 200 reduces a quantity of switches and diodes relative to the 2n inverter topology associated with a quantity 2n switches and 2n diodes.

As shown in FIG. 2B, the inverter topology 200' includes a set of phase modules 252-1, 252-2, 252-3, . . . , 252-N configured in another n+1 type of inverter topology.

As further shown in FIG. 2B, and by call-out 254-1, the phase module 252-2 is electrically coupled to a shared switch 256-1, a shared diode 258-1, a shared switch 256-2, and a shared diode 258-2. In some implementations, a switch, such as the shared switch 256-1, the shared switch 256-2, and/or the like may be an insulated-gate bipolar transistor (IGBT).

In some implementations, the shared switch 256-1 and the shared diode 258-1 are shared with the phase module 252-1, which includes an electromagnet 260-1 (not shown). In some implementations, the phase module 252-2 is coupled to an electromagnet 260-2 to provide a phase output to enable inversion of DC current to AC current. A first electrical path is formed, for the phase module 252-2, by the shared switch 256-1, the shared diode 258-2, and the electromagnet 260-2. A second electrical path is formed, for the phase module 252-2, by the shared switch 256-2, the shared diode 258-1, and the electromagnet 260-2.

Similarly, as further shown in FIG. 2B, and by call-out 254-2, the phase module 252-2 is electrically coupled to the shared switch 256-2, the shared diode 258-2, a shared switch 256-3, and a shared diode 258-3. In some implementations, the phase module 252-3 is coupled to an electromagnet 260-3 to provide a phase output to enable inversion of DC current to AC current. A first electrical path is formed, for the phase module 252-3, by the shared switch 256-2, the shared diode 258-3, and the electromagnet 260-3. A second electrical path is formed, for the phase module 252-3, by the shared switch 256-3, the shared diode 258-2, and the electromagnet 260-3.

In this case, each phase module 252-2 through 252-N-1 is coupled to a set of two shared switches 256 and shared diodes 258. Phase modules 202-1 and 202-N (e.g., end phase modules) are coupled to a non-shared switch and a non-shared diode. In this way, the phase modules are partially decoupled, thereby reducing a quantity of diodes and switches relative to a fully decoupled 2n type of inverter topology wherein each phase module is associated with two non-shared switches and two non-shared diodes. For example, the n+1 inverter topology shown by inverter topology 200' is associated with a quantity n+1 switches and n+1 diodes, wherein n represents a quantity of phase modules 252 in the inverter topology 200', thereby reducing a quantity of switches and diodes relative to the 2n inverter topology associated with a quantity 2n switches and 2n diodes.

In this way, based on using inverter topology 200/200', an input DC current may be inverted into an output AC current using a reduced quantity of diodes and switches relative to other inverter topologies, thereby improving manufacturability and/or the like for an inverter, a machine, and/or the like.

INDUSTRIAL APPLICABILITY

The inverter topology 200/200' may be used with the machine 100 and the power source 102 to enable utilization of the electric drive system 104 of the machine 100. During operation of the machine 100, switches and/or diodes of the inverter topology 200/200' may be activated and/or deactivated based on control signals to cause the inverter topology 200/200' to provide a desired phase to invert DC current provided by the power source 102 for utilization as AC current by the electric drive system 104, the motor 110, and/or the like, thereby enabling movement of the machine 100 via the traction system 106 and/or movement of the implement 118. In some implementations, the inverter topology 200/200' may be coupled to a motor, such as the motor 110 of the electric drive system 104, and may provide a plurality of phase outputs to the motor 110 of the electric drive system 104 to control rotation of the drive shaft 112.

Thus, using the inverter topology 200/200' enables operation of the machine 100 with a reduced quantity of diodes and/or switches for an inverter of the machine 100, thereby reducing cost, improving manufacturability, reducing a likelihood of failure, and/or the like relative to use of other inverter topologies.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. An electrical inverter comprising:
   A plurality of phase modules to provide a plurality of phase outputs,
   Wherein two or more of the plurality of phase modules share a common insulated-gate bipolar transistor and
      Wherein a phase module of the plurality of phase modules is coupled to non-shared diode.

2. The electrical inverter of claim 1, wherein the plurality of phase modules share a single insulated-gate bipolar transistor, and
   wherein each phase module, of the plurality of phase modules, is coupled to a corresponding non-shared insulated-gate bipolar transistor.

3. The electrical inverter of claim 1, wherein a first phase module, of the plurality of phase modules, and a second phase module, of the plurality of phase modules, share a first insulated-gate bipolar transistor, and
   wherein the second phase module and a third phase module, of the plurality of phase modules, share a second insulated-gate bipolar transistor.

4. The electrical inverter of claim 3, wherein the first insulated-gate bipolar transistor and the second insulated-gate bipolar transistor are different insulated-gate bipolar transistors.

5. The electrical inverter of claim 1, wherein the two or more of the plurality of phase modules share a common diode.

6. The electrical inverter of claim 1, wherein the plurality of phase modules share a single common diode, and
   wherein each phase module, of the plurality of phase modules, is coupled to a corresponding non-shared diode.

7. The electrical inverter of claim 1, wherein a first phase module, of the plurality of phase modules, and a second phase module, of the plurality of phase modules, share a first diode, and
   wherein the second phase module and a third phase module, of the plurality of phase modules, share a second diode.

8. The electrical inverter of claim 7, wherein the first diode and the second diode are different diodes.

9. A system, comprising:
a multi-phase electrical inverter,
wherein two or more phase modules, of a plurality of phase modules of the multi-phase electrical inverter, share a common transistor and a common diode, and wherein the common transistor is a common insulated-gate bipolar transistor; and
a motor coupled to the multi-phase electrical inverter.

10. The system of claim 9, wherein a phase module, of the plurality of phase modules connects to a voltage source to provide a voltage, and comprises an electromagnet that is configured to provide a magnetic field based on the voltage.

11. The system of claim 9, wherein the motor is configured to receive a plurality of phase signals corresponding to the plurality of phase modules.

12. The system of claim 9, wherein the common transistor and the common diode are configured to control a phase provided by the two or more phase modules.

13. The system of claim 9, wherein a quantity of phase modules, of the plurality of phase modules, is n, such that a quantity of transistors, t, in the multi-phase electrical inverter is represented by t=n+1.

14. The system of claim 9, wherein a quantity of phase modules, of the plurality of phase modules, is n, such that a quantity of diodes, d, in the multi-phase electrical inverter is represented by d=n+1.

15. The system of claim 9, wherein a quantity of transistors of the multi-phase electrical inverter is less than twice a quantity of phase modules of the plurality of phase modules.

16. The system of claim 9, wherein a quantity of diodes of the multi-phase electrical inverter is less than twice a quantity of phase modules of the plurality of phase modules.

17. An inverter, comprising:
a plurality of electromagnets;
a plurality of diodes coupled to the plurality of electromagnets to provide a voltage; and
a plurality of insulated-gate bipolar transistors coupled to the plurality of electromagnets and the plurality of diodes to selectively activate the plurality of electromagnets to cause a phase output from the inverter,
wherein a first insulated-gate bipolar transistor, of the plurality of insulated-gate bipolar transistors, is coupled to a first electromagnet and to a second electromagnet of the plurality of electromagnets,
wherein a second insulated-gate bipolar transistor, of the plurality of insulated-gate bipolar transistors, is coupled to the second electromagnet and to a third electromagnet of the plurality of electromagnets, and
wherein a third insulated-gate bipolar transistor, of the plurality of insulated-gate bipolar transistors, is coupled to the third electromagnet and not to the first electromagnet and not to the second electromagnet.

18. The inverter of claim 17, wherein the third insulated-gate bipolar transistor is coupled to a single electromagnet.

19. The inverter of claim 17, wherein the inverter controls a motor with the phase output.

20. The inverter of claim 17, wherein the inverter is a 3-phase inverter.

21. The system of claim 9, wherein each phase module, of the two or more phase modules, is coupled to a corresponding non-shared diode.

* * * * *